June 2, 1936. H. P. ELLIOTT 2,042,516
STENCIL TRAY AND TRAY HOLDER
Filed Aug. 31, 1934 2 Sheets-Sheet 1
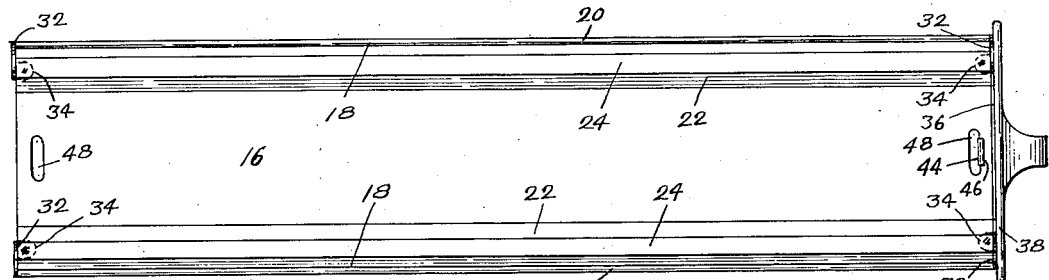

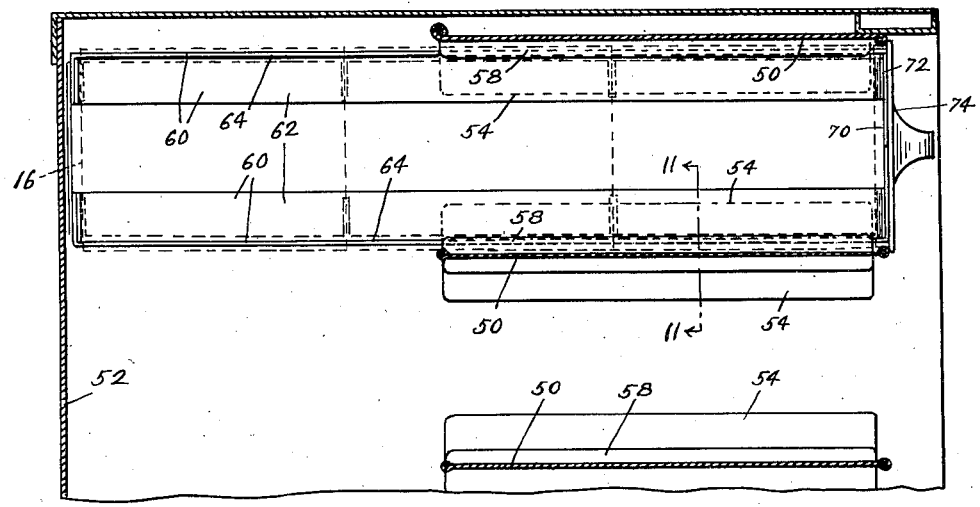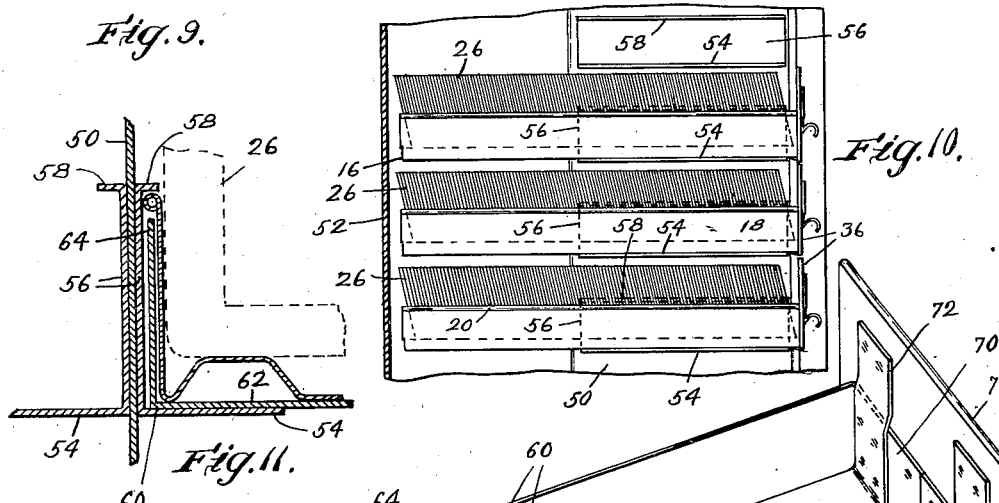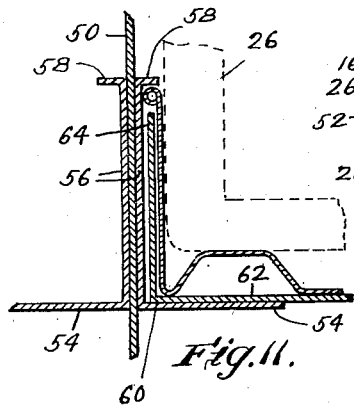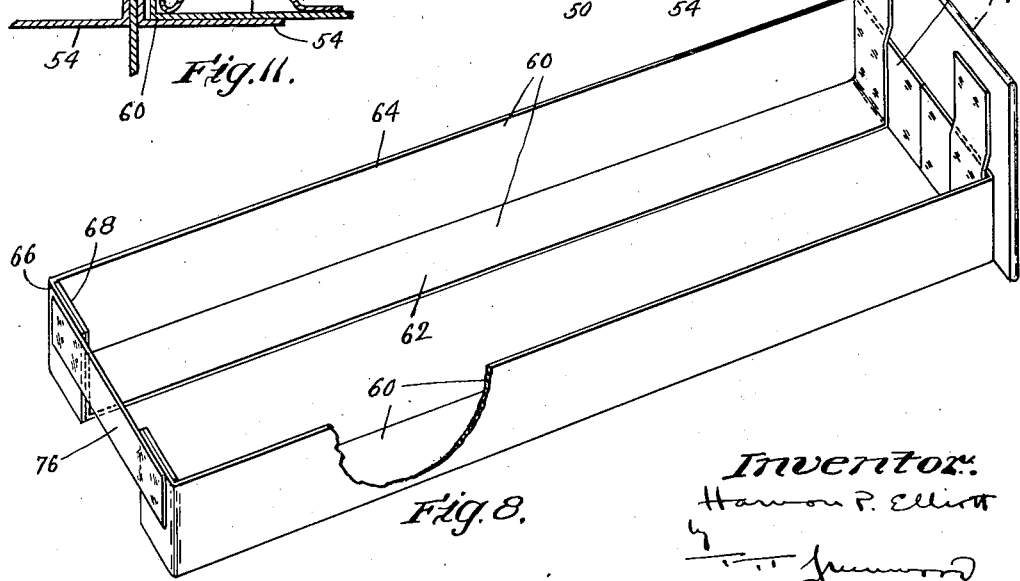

Patented June 2, 1936

2,042,516

UNITED STATES PATENT OFFICE 2,042,516

STENCIL TRAY AND TRAY HOLDER

Harmon P. Elliott, Watertown, Mass.

Application August 31, 1934, Serial No. 742,254

4 Claims. (Cl. 101—47)

This invention relates to trays adapted to contain a collection of edgewise disposed printing devices, particularly stencils, which are adapted to be transferred, as a unitary collection, from the tray to the holder of an addressing machine.

For this purpose the tray is provided with an open-ended channel which underlies the bottom edges of the stencils and is adapted to receive the tongue of the stencil holder so that the collection of stencils in the tray can be held together and placed in the holder as a unit and the tray subsequently removed from around the stencils.

Heretofore the bottom wall of the tray was formed with upstanding sides terminated in laterally outstanding sections or shelves elevated above the bottom wall and providing support for the bottom edges of the stencils, and an intermediate channel for the tongue of the stencil holder. Such a tray is satisfactory for the purpose but the bottom wall is relatively narrow compared with the transverse width of the tray so that it is possible to tilt the tray when it rests upon a flat surface as a table top as is frequently necessary in cataloging or re-arranging the stencils. In my Patent No. 1,949,535, dated March 6, 1934, I have disclosed such a tray and have provided a construction to prevent the lateral tilting of the tray. This construction is satisfactory for the intended purpose in that it provides lateral stability when the front end of the tray rests upon a support. It is an object of the present invention, however, to provide a tray so constructed that it is laterally stable throughout its entire length.

The tray of the present invention is intended to be contained in a filing cabinet and supported upon confronting lips or shelves thereof that have such close vertical spacing that the usual tray, which is intended to be supported intermediate its height, may interfere with or project into the space occupied by the stencils in the next lower tray. Hence a further object of the present invention is the provision of a stencil tray adapted to be contained in the cabinet constructed as above described and at the same time be laterally stable when it rests upon a table top or other flat supporting surface.

Many users of stencils and addressing machines have their collection of stencils contained in short trays that are adapted more particularly for use in connection with hand operated addressing machines and do not like to discard these trays when they acquire larger power operated machines that ordinarily are intended to take the larger collection of stencils contained in a longer tray. The cabinet above described is adapted to contain the longer stencil trays and for these long trays it is sufficient to have the tray supporting shelves extend only part way of the length of the tray. The length of the shelves may be sufficient to support a short tray but the cabinet space is then not efficiently utilized, there being a large amount of unoccupied space behind the shelves. Hence a further object of the present invention is in the provision of a holder for a series of short trays so arranged that it cooperates with the tray supporting shelves of the cabinet and permits a series of short trays to be disposed in the same tray compartment.

The tray embodying the present invention has a bottom wall, and upstanding side walls, the bottom wall being provided close to but within its side edges with a pair of longitudinally extended reflexed portions forming inverted channels, the tops of which constitute the stencil supporting shelves that support the bottom edges of the stencils in spaced relation above the bottom wall between the channels. The bottom edges of the side walls at the outer edges of the channel lie in the same plane as the bottom wall between the channels and hence provide lateral support for the tray and also support the tray on the cabinet shelves so that no part of the tray depends to any undesirable extent below the line of the cabinet shelves. Such a tray represents another object of the invention.

A further object is generally to improve the construction of stencil trays.

Fig. 1 is a plan view of a stencil tray embodying the present invention.

Fig. 2 is a front elevation of the tray of Fig. 1.

Fig. 3 is a rear elevation of the tray of Fig. 1.

Fig. 4 is a sectional detail taken along line 4—4 of Fig. 2.

Fig. 5 is a perspective detail of a portion of the rear end of the tray.

Fig. 6 is a bottom end view of the rear end part of the tray.

Fig. 7 is a perspective view of a short tray.

Fig. 8 is a perspective view of a holder for a series of short trays.

Fig. 9 is a plan detail of a section of the tray supporting filing cabinet illustrating some of the tray supporting shelves and the holder of Fig. 8 therein.

Fig. 10 is a sectional elevation of the cabinet of Fig. 9.

Fig. 11 is a sectional detail of a tray supporting shelf taken along line 11—11 of Fig. 10.

The stencil tray herein illustrated in Figs. 1 through 7 as embodying the present invention is formed of a single sheet of metal having the horizontal bottom wall 16 and upstanding side walls 18 that are formed with curled over top edges 20. In accordance with this invention the bottom wall is provided close to the side walls with longitudinal ridges 22 formed by reflexing the side wall material into inverted channels 23. The ridges 22 are parallel with each other and with the side walls and are disposed close to the side walls and have upper and preferably flat surfaces 24 that are disposed in the same plane and constitute shelves on which the lower edges of the collection of stencils 26 in the tray are adapted to rest. The bottom of the tray, below the shelves, is provided with ledges or runners 28 formed by the junction of the side walls with the ridges 22, which ledges are in the plane of the bottom wall and provide lateral support for the tray when it rests upon a flat surface as a table top. The ledges 28 also engage the shelves of the filing cabinet as will presently appear.

The front and rear edges 30 of the bottom portion of the tray are folded onto the body of the tray bottom to provide added stiffness thereat, the end of the marginal portions being folded into contact with the bottom faces of the channels forming the ridges 22. The side walls 18 at their ends are provided with integral outstanding ears 32 which are reflexed into positions transversely of the tray and form end walls that retain the collection of stencils within the tray. The ears 32 are provided with tabs 34 that are reflexed into contact with the bottom walls of the channels and are secured as spot welded thereto. The ears, however, terminate at the confronting sides of the ridges so that the space between the confronting sides of the ridges and under the stencils is free and clear to permit the insertion of the tongue of the stencil holder of an addressing machine so that all of the stencils in the tray can be guided as a body into a stencil holder.

The tray is provided with a rectangular front plate 36 that has curled edges 38 and engages the flat faces of a set of ears 32 and is secured to the ears by rivets 40 which pass through rivet holes 42 formed in the ears. The front plate is additionally secured to the tray by a clip 44 which engages the bottom curled edge of the front plate and has a tab that projects into and through a transversely elongated slot 48 formed in the bottom wall of the tray and is reflexed over and upon the bottom wall. The front and rear ends of the tray are identical in construction and each end is provided with a slot 48 and rivet holes 42 in the ears 32. Thus it is immaterial to which end the front plate 36 is secured.

Fig. 7 illustrates a short tray which may be only one-third as long as the long tray of Fig. 1. The tray is or can be identical in construction with the long tray of Fig. 1 except that it is not provided with a front plate 36.

The tray embodying the present invention is intended to be stored in a cabinet, the general construction of which is sufficiently illustrated in Figs. 9, 10, and 11. Said cabinet comprises a plurality of horizontally spaced vertical partition plates 50 between each pair of which a vertical series of stencil trays are adapted to be disposed. The rear edges of said plates are located a considerable distance forwardly of the rear cabinet wall 52 so that there is a space therebetween that is longer than the length of a short tray. The partition plates 50 are provided with vertical sets of confronting tray supporting members having horizontal relatively narrow lips or shelves 54 that are extended toward each other and are adapted to underlie and support the stencil trays. The shelves are narrow so that they terminate at the channels 23 of the tray. The shelf members are provided with vertical webs 56 that lie against and are suitably secured to said partition walls 50 and have horizontal upper lips 58 that are directed inwardly toward each other and overlie the top edges 20 of the stencil trays so as to support them against tilting downwardly when they are in a partially withdrawn position.

With the construction of stencil tray herein illustrated the side ridges or runners 28 of the tray bear against and ride upon the shelves 54 so that there is no part of the tray which depends below the level of the shelves. Hence the trays can be close together as illustrated in Fig. 10 and any one tray can be removed without interference with an adjacent tray.

As has been stated above it is desirable to utilize this type of cabinet to hold the stencil tray illustrated in Fig. 7 which, ordinarily, can not be done and at the same time utilize the capacity of the cabinet to fullest advantage because of the short shelves. Hence a tray holder as illustrated in Figs. 8 and 9 is provided. The tray holder comprises a pair of angle members 60 having horizontal walls 62 and vertical walls 64 somewhat shorter in height than the height of the side walls of the tray. Each angle member is formed of flat sheet material reflexed into right angles in the longitudinal median line thereof with the rear ends 66 and 68 overlapping and with the front ends 70 and 72 also overlapping but extended at right angles beyond each other. The two angle members are disposed in parallel relation and the front ends 70 and 72 are secured as by spot welding to the rear face of a rectangular plate 74 which may be identical with the front plate 36 of Fig. 4. The rear ends are united in spaced relation by a connecting plate 76. The holder thus formed is adapted to hold three of the short stencil trays of Fig. 7, as illustrated in Fig. 9. The curled-over top edges 30 of the trays project above the top side edges of the vertical sides 64 of the holder and underlie and are adapted to engage the lips 58 of the shelf members of the cabinet, as has been described in connection with the long tray. The tray holder extends approximately to the rear cabinet wall 52 and thus provides support for all the trays therein notwithstanding the absence of shelves under some of the trays. The holder with the filled short trays can be removed from the cabinet and utilized like a long tray.

I claim:

1. A stencil holding tray having a bottom wall and upstanding side walls, said bottom wall having on the bottom face thereof adjacent and parallel with the side walls tray-supporting runners and having inside the tray adjacent and parallel with the side walls upstanding ledges forming stencil supporting shelves, an end of the tray being open above and to the clear tongue space between said ledges under the stencils, and said tray at the ends above said tongue space having end walls which overlie the stencil space and retain the stencils against endwise displacement out of the tray.

2. A stencil holding tray comprising a bottom wall and integral upstanding side walls, said bottom wall having inverted channel formations in its bottom face providing interior ledges that are parallel with and close to said side walls, said bottom wall also having runners that are below said ledges and are parallel therewith and between them and said side walls, an end of said tray being open above and to the clear tongue space between said ledges under the stencil supporting faces thereof, and ears at the ends of the tray which confront the stencil space thereof but are disposed above said tongue space and retain the stencils against endwise displacement out of the tray.

3. A stencil holding tray having a bottom wall and upstanding side walls, said bottom wall having a pair of inverted channels formed therein close to and parallel with said side walls and providing interior elevated stencil supporting ledges and an intermediate clear tongue receiving channel, a marginal edge of said bottom wall being reflexed upon the body of said wall and lying at least in part in said channels, said side walls having integral ears located only at the sides of said tongue-receiving channel and constituting end walls which leave open the space above said tongue-receiving channel, said ears being reflexed inwardly toward each other and having tabs located in the ends of said channels against said reflexed marginal portion and fixed thereto.

4. A stencil holding tray having a bottom wall and upstanding side walls, said side walls having integral ears reflexed inwardly toward each other, means securing said ears to said bottom wall, said bottom wall adjacent the edge thereof having a slot therethrough, a front plate on the end of said tray against said ears, means securing said front plate to said ears, and a clip engaged with the bottom edge of said front plate having a part extended through said slot and reflexed over said bottom wall.

HARMON P. ELLIOTT.